(12) United States Patent
Feng et al.

(10) Patent No.: US 9,880,665 B2
(45) Date of Patent: Jan. 30, 2018

(54) TOUCH SCREEN AND TOUCH-SENSITIVE APPARATUS

(71) Applicants: BOE Technology Group Co., Ltd., Beijing (CN); BOE (Hebei) Mobile Display Technology Co., Ltd., Hebei (CN)

(72) Inventors: Xuqing Feng, Beijing (CN); Tingting Zhao, Beijing (CN); Haiwei Sun, Beijing (CN)

(73) Assignees: BOE TECHNOLOGY GROUP CO., LTD., Beijing (CN); BOE (HEBEI) MOBILE DISPLAY TECHNOLOGY CO., LTD., Hebei (CN)

( * ) Notice: Subject to any disclaimer, the term of this patent is extended or adjusted under 35 U.S.C. 154(b) by 8 days.

(21) Appl. No.: 15/208,972

(22) Filed: Jul. 13, 2016

(65) Prior Publication Data

US 2017/0192609 A1 Jul. 6, 2017

(30) Foreign Application Priority Data

Jan. 5, 2016 (CN) .......................... 2016 1 0005821

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/041* (2013.01); *G06F 3/044* (2013.01); *G06F 3/0412* (2013.01); *G06F 2203/04107* (2013.01)

(58) Field of Classification Search
CPC ........ G06F 3/041; G06F 3/0412; G06F 3/044; G06F 3/045; G06F 3/046; G06F 2203/04107
See application file for complete search history.

(56) References Cited

U.S. PATENT DOCUMENTS

| 8,730,195 B2* | 5/2014 | Wu .......................... G06F 3/041 345/173 |
| 2002/0000977 A1* | 1/2002 | Vranish ................... G06F 3/044 345/173 |
| 2005/0012699 A1* | 1/2005 | Lee .................... G02F 1/134336 345/87 |

(Continued)

*Primary Examiner* — Joe H Cheng
(74) *Attorney, Agent, or Firm* — Westman, Champlin & Koehler, P.A.

(57) ABSTRACT

The present disclosure relates to field of display technique and discloses a touch screen and a touch-sensitive apparatus to prevent light rays outside a display region of the touch-sensitive apparatus from being reflected toward the display region through a silver paste layer, thereby reducing a light leak of the touch-sensitive apparatus and thus improving display effect and yield rate thereof. The touch screen comprises a first transparent substrate layer and a first tin indium oxide layer and a silver paste layer formed on the first transparent substrate layer. The silver paste layer is electrically connected with the first tin indium oxide layer and arranged within a non-display region of the touch screen. The touch screen further comprises a shielding layer arranged on a side of the silver paste layer where the first transparent substrate layer is located and configured for shielding the silver paste layer.

18 Claims, 3 Drawing Sheets

(56) References Cited

U.S. PATENT DOCUMENTS

| | | | | |
|---|---|---|---|---|
| 2007/0242055 | A1* | 10/2007 | Lai | G06F 3/0412 |
| | | | | 345/173 |
| 2009/0284487 | A1* | 11/2009 | Nakanishi | G06F 3/045 |
| | | | | 345/173 |
| 2011/0285640 | A1* | 11/2011 | Park | G02F 1/13338 |
| | | | | 345/173 |
| 2012/0249465 | A1* | 10/2012 | Lin | G06F 3/041 |
| | | | | 345/173 |
| 2013/0027325 | A1* | 1/2013 | Liu | G06F 3/0412 |
| | | | | 345/173 |
| 2013/0044074 | A1* | 2/2013 | Park | G02F 1/13338 |
| | | | | 345/174 |
| 2013/0058128 | A1* | 3/2013 | Cho | G06F 1/1626 |
| | | | | 362/602 |
| 2013/0135233 | A1* | 5/2013 | Wang | G06F 3/041 |
| | | | | 345/173 |
| 2013/0201145 | A1* | 8/2013 | Park | C09J 133/14 |
| | | | | 345/173 |
| 2013/0215082 | A1* | 8/2013 | Mi | G06F 3/044 |
| | | | | 345/174 |
| 2014/0008202 | A1* | 1/2014 | Lin | H03K 17/962 |
| | | | | 200/600 |
| 2014/0184941 | A1* | 7/2014 | Lee | G06F 3/041 |
| | | | | 349/12 |
| 2014/0340605 | A1* | 11/2014 | Takeda | G02F 1/134363 |
| | | | | 349/43 |
| 2015/0062456 | A1* | 3/2015 | Miyazaki | G06F 3/044 |
| | | | | 349/12 |
| 2015/0286301 | A1* | 10/2015 | Yang | G06F 3/041 |
| | | | | 345/173 |
| 2016/0124546 | A1* | 5/2016 | Chen | G06F 3/044 |
| | | | | 345/174 |

* cited by examiner

TOUCH SCREEN AND TOUCH-SENSITIVE APPARATUS

CROSS-REFERENCE TO RELATED APPLICATION

This application claims the benefit of Chinese Patent Application No. CN201610005821.3 filed on Jan. 5, 2016 in the State Intellectual Property Office of China, the whole disclosure of which is incorporated herein by reference.

BACKGROUND OF THE INVENTION

Field of the Invention

Embodiments of the present disclosure generally relate to field of display technique, in particular to a touch screen and a touch-sensitive apparatus.

Description of the Related Art

A capacitive touch screen operates by means of human current induction. A touch screen may be classified according to various ways. A first classification is based on operation principle of a touch screen and an information transmission medium. In this way, the touch screen may include a resistance-type, a capacitive induction-type, an infrared-type and a surface acoustic wave-type. A second one is based on mounting way. In this way, the touch screen may include an out-cell-type, an in-cell-type and an integrated-type. A third one is based on technical principle. In this way, the touch screen may include a vector pressure sensor technique touch screen, a resistance technique touch screen, a capacitive technique touch screen, an infrared technique touch screen, and a surface acoustic wave technique touch screen.

FIG. 1 shows a schematic structural view of a touch screen in the prior art. As shown in FIG. 1, an out-cell touch screen in the prior art mainly comprises a cover glass 01, a first optical transparent adhesive layer 02, a first tin indium oxide layer 03, a first transparent substrate layer 04, a second optical transparent adhesive layer 05, a second tin indium oxide layer 06 and a second transparent substrate layer 07. Generally, when manufacturing the touch screen, the first tin indium oxide layer 03 and the second tin indium oxide layer 06 are firstly formed on the first transparent substrate layer 04 and the second transparent substrate layer 07 respectively, and then the two transparent substrate layers formed with the tin indium oxide layers are bonded together by the second optical transparent adhesive layer 05 and the first tin indium oxide layer 03 is leaded out to be connected with a flexible circuit board through a silver paste layer 08. Finally, the cover glass 01 is attached to the first tin indium oxide layer 03 through the first optical transparent adhesive layer 02.

FIG. 2 shows a schematic partial structural view of a touch-sensitive apparatus in the prior art, and FIG. 3 shows a partial enlarged view of a section A of the touch-sensitive apparatus shown in FIG. 2. As shown in FIGS. 2 and 3, the sliver paste layer is arranged in a non-display region of the touch-sensitive apparatus. Since the sliver paste layer has a good light reflective effect, light rays outside a display region 09 of the touch-sensitive apparatus are easily reflected toward the display region of the touch-sensitive apparatus through the sliver paste layer (as denoted by arrows in FIGS. 2 and 3), which may cause the touch-sensitive apparatus to generate a light leak, thereby affecting display effect and yield rate thereof.

SUMMARY OF THE INVENTION

Embodiments of the present disclosure provide a touch screen and a touch-sensitive apparatus to prevent light rays outside a display region of the touch-sensitive apparatus from being reflected toward the display region through a silver paste layer, thereby reducing a light leak of the touch-sensitive apparatus and thus improving display effect and yield rate thereof.

According to one aspect of the present disclosure, there is provided a touch screen comprising a first transparent substrate layer and a first tin indium oxide layer and a silver paste layer formed on the first transparent substrate layer. The silver paste layer is electrically connected with the first tin indium oxide layer and arranged within a non-display region of the touch screen. The touch screen further comprises a shielding layer arranged on a side of the silver paste layer where the first transparent substrate layer is located and configured for shielding the silver paste layer.

With the touch screen according to exemplary embodiments of the present disclosure, by providing the shielding layer, it is possible to allow light rays outside the display region to be absorbed by the shielding layer arranged on the one side of the sliver paste layer toward the first transparent substrate firstly rather than being irradiated onto the silver paste layer and then reflected toward the display region of the touch screen. Therefore, the touch screen according to the exemplary embodiments of the present disclosure can reduce a light leak of the touch-sensitive apparatus, thereby improving display effect and yield rate thereof.

In some exemplary embodiments of the present disclosure, the above touch screen further comprises a first optical transparent adhesive layer arranged on a side of the first transparent substrate layer facing away from the silver paste layer; a second tin indium oxide layer arranged on a side of the first optical transparent adhesive layer facing away from the first transparent substrate layer; and a second transparent substrate layer arranged on a side of the second tin indium oxide layer facing away from the first optical transparent adhesive layer.

In some exemplary embodiments of the present disclosure, the shielding layer is arranged on a surface of the first transparent substrate layer facing away from the silver paste layer.

In some exemplary embodiments of the present disclosure, the shielding layer is arranged on a surface of the first optical transparent adhesive layer facing away from the first transparent substrate layer.

In some exemplary embodiments of the present disclosure, wherein the shielding layer is arranged on a surface of the second tin indium oxide layer facing toward the second transparent substrate layer.

In some exemplary embodiments of the present disclosure, the shielding layer has a thickness of 5-10 μm.

In some exemplary embodiments of the present disclosure, a distance between an edge of the shielding layer close to the display region and an edge of the display region is smaller than that between an edge of the silver paste layer close to the display region and the edge of the display region by 0.15-0.25 mm.

In some exemplary embodiment of the present disclosure, the shielding layer is made of a black ink material or a black matrix material.

In some exemplary embodiments of the present disclosure, the above touch screen further comprises a second optical transparent adhesive layer arranged on a side of the first tin indium oxide layer facing away from the first transparent substrate layer, and a cover glass arranged on a side of the second optical transparent adhesive layer facing away from the first tin indium oxide layer.

According to another aspect of the present disclosure, there is provided a touch-sensitive apparatus comprising the touch screen as described above. Since the above touch screen can prevent light rays outside the display region of the touch-sensitive apparatus from being reflected toward the display region through the silver paste layer, thereby reducing the light leak of the touch-sensitive apparatus and thus improving display effect and yield rate thereof, the touch-sensitive apparatus has a good display effect.

BRIEF DESCRIPTION OF THE DRAWINGS

The accompanying drawings herein can provide further understanding to embodiments of the present disclosure and form a part of the embodiments of the present disclosure. Exemplary embodiments of the present invention and their description are intended to explain the invention, rather than being construed as limiting the invention. In the drawings.

DETAILED DESCRIPTION OF PREFERRED EMBODIMENTS OF THE INVENTION

Embodiments of the disclosure will be clearly and fully described hereinafter with reference to the accompanying drawings. Obviously, the described embodiments are merely part of the embodiments of the disclosure, rather than all embodiments of the disclosure.

Figure 1:
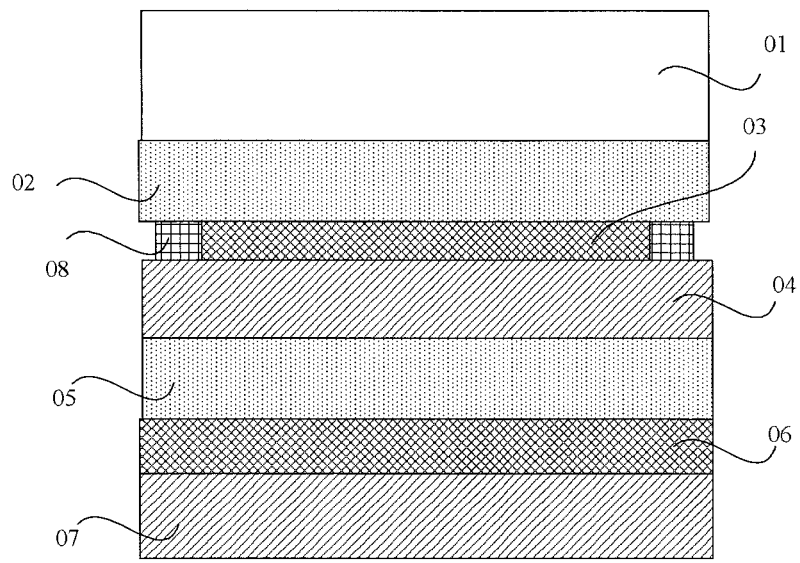
FIG. 1 is a structural schematic view of a touch screen in the prior art.
Figure 2:
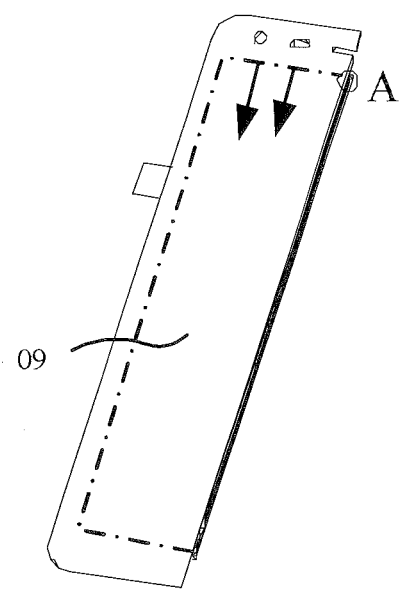
FIG. 2 is schematic partial structural section view of the touch-sensitive apparatus in the prior art.
Figure 3:
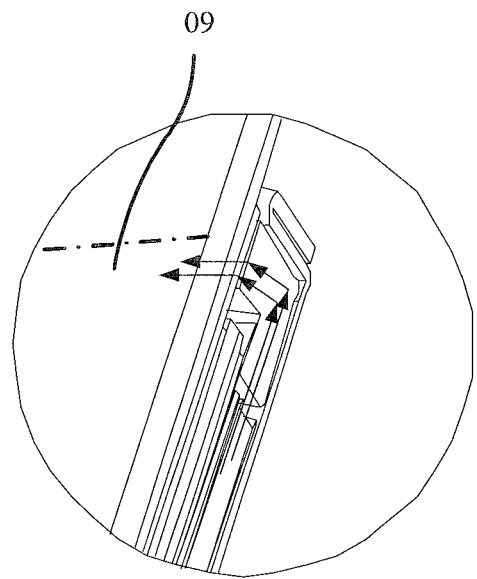
FIG. 3 is a partial enlarged view of a section A of the touch-sensitive apparatus shown in FIG. 2.
Figure 4:
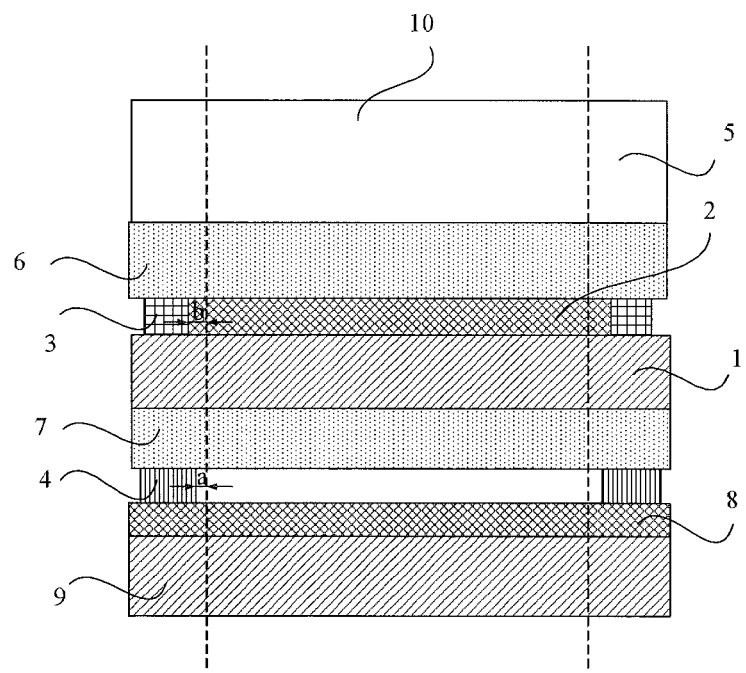
FIG. 4 is a schematic structural view of a touch screen according to an exemplary embodiment of the present disclosure.
Figure 5:
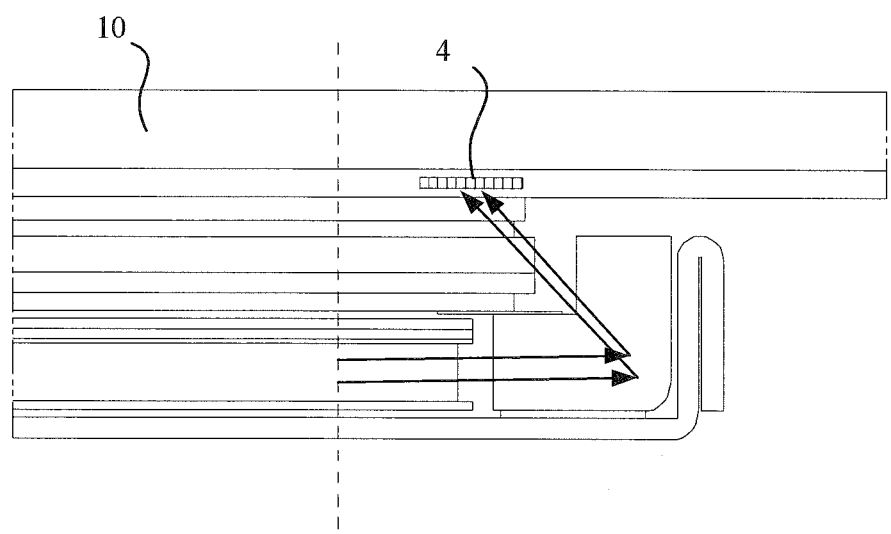
FIG. 5 is a schematic partial structural section view of a touch-sensitive apparatus according to an exemplary embodiment of the present disclosure.

FIG. 4 is a schematic structural view of a touch screen according to an exemplary embodiment of the present disclosure, and FIG. 5 is a schematic partial structural section view of a touch-sensitive apparatus according to an exemplary embodiment of the present disclosure. As shown in FIGS. 4 and 5, the touch screen according to an exemplary embodiment comprises a first transparent substrate layer 1, a first tin indium oxide layer 2 and a sliver paste layer 3 formed on the first transparent substrate layer 1. The silver paste layer 3 is electrically connected with the first tin indium oxide layer 2 and is arranged within a non-display region of the touch screen. The touch screen further comprises a shielding layer 4 arranged on a side of the sliver paste layer 3 where the first transparent substrate 1 is located and configured for shielding the silver paste layer 3.

with the touch screen according to the exemplary embodiment of the present disclosure, by providing the shielding layer 4, it is possible to allow light rays outside a display region to be absorbed by the shielding layer 4 arranged on a side of the sliver paste layer 3 where the first transparent substrate 1 is located (as denoted by the arrows in FIG. 5) rather than being irradiated onto the silver paste layer 3 and reflected toward the display region. Therefore, the touch screen according to the exemplary embodiment of the present disclosure can reduce a light leak of the touch-sensitive apparatus, thereby improving display effect and yield rate thereof.

The touch screen as described above further comprises a first optical transparent adhesive layer 7 arranged on a side of the first transparent substrate layer 1 facing away from the sliver paste layer 3, a second tin indium oxide layer 8 arranged on a side of the first optical transparent adhesive layer 7 facing away from the first transparent substrate layer 1, and a second transparent substrate layer 9 arranged on a side of the tin indium oxide layer 8 facing away from the first optical transparent adhesive layer 7.

The shielding layer 4 as described above may be provided in different positions.

Optionally, the shielding layer 4 may be arranged on a surface of the first transparent substrate layer 1 facing away from the sliver paste layer 3.

Optionally, the shielding layer 4 may be arranged on a surface of the first optical transparent adhesive layer 7 facing away from the first transparent substrate layer 1.

Optionally, the shielding layer 4 may be arranged on a surface of the second tin indium oxide layer 8 facing toward the second transparent substrate layer 9.

Typically, the shielding layer 4 as described above has a thickness of 5-10 μm. For example, the shielding layer 4 may has a thickness of 5 μm, 5.5 μm, 6 μm, 6.5 μm, 7 μm, 8 μm, 9 μm, 10 μm and etc., and the description thereof in detail is omitted herein.

Typically, as shown in FIG. 4, a distance a between an edge of the shielding layer 4 close to the display region 10 and an edge of the display region 10 is smaller than a distance b between an edge of the silver paste layer 3 close to the display region 10 and the edge of the display region 10 by 0.15-0.25 mm. That is to say, a width of the shielding layer 4 is larger than that of the silver paste layer 3.

The above shielding layer 4 may be made of various materials. Optionally, the shielding layer 4 may be made of a black ink material.

Optionally, the shielding layer may be made of a black matrix material.

In certain alternative embodiments of the present disclosure, the touch screen as described above further comprises a second optical transparent adhesive layer 6 arranged on a side of the first tin indium oxide layer 2 facing away from the first transparent substrate layer 1, and a cover glass 5 arranged on a side of the second optical transparent adhesive layer 6 facing away from the first tin indium oxide layer 2.

During manufacturing the above touch screen, the first tin indium oxide layer 2 and the second tin indium oxide layer 8 may be firstly formed on the first transparent substrate layer 1 and the second transparent substrate layer 9, respectively, and then the shielding layer 4 is formed on the second tin indium oxide layer 8. Then, the two transparent substrate layers formed with the tin indium oxide layers are bonded together by the first optical transparent adhesive layer 7. Thereafter, the first tin indium oxide layer 2 is leaded out to be connected with a flexible circuit board through the silver paste layer 3. Finally, the cover glass 5 is connected with the first tin indium oxide layer 2 by the second optical transparent adhesive layer 6. Alternatively, the first tin indium oxide layer 2 and the second tin indium oxide layer 8 may be firstly formed on the first transparent substrate layer 1 and the second transparent substrate layer 9, respectively, and then the first optical transparent adhesive layer 7 is formed on a side of the first transparent substrate layer 1 facing away from the first tin indium oxide layer 2. Then, the shielding layer 4 is formed on a surface of the first optical transparent adhesive layer 7 facing away from the first transparent substrate layer 1, and the second transparent substrate layer 9 formed with the second tin indium oxide layer 8 is bonded with the first transparent substrate layer 1 through the first optical transparent adhesive layer 7 formed on the first transparent substrate layer 1. Thereafter, the first tin indium oxide layer 2 is leaded out to be connected with the flexible circuit board through the silver paste layer 3. Finally, the cover glass 5 is connected with the first tin indium oxide layer 2 by the second optical transparent adhesive layer 6.

Embodiments of the present disclosure further provide a touch-sensitive apparatus comprising the touch screen as described above. Since the above touch screen can prevent light rays outside the display region of the touch-sensitive apparatus from being reflected toward the display region through the silver paste layer, thereby reducing the light leak of the touch-sensitive apparatus and thus improving display effect and yield rate thereof, the touch-sensitive apparatus has a good display effect.

Obviously, it would be appreciated by those skilled in the art that various changes or modifications may be made to the embodiments of the present disclosure without departing from the principle and spirit thereof. If these changes or modifications to the embodiments of the present disclosure fall within the scope defined in claims and their equivalents of the present disclosure, the present disclosure are intended to cover these changes or modifications.

What is claimed is:

1. A touch screen comprising
   a first transparent substrate layer; and
   a first tin indium oxide layer and a silver paste layer formed on the first transparent substrate layer, the silver paste layer being electrically connected with the first tin indium oxide layer and arranged within a non-display region of the touch screen;
   wherein the touch screen further comprises a shielding layer arranged on a side of the silver paste layer where the first transparent substrate layer is located and configured for shielding the silver paste layer,
   wherein the shielding layer is arranged on a surface of the first transparent substrate layer facing away from the silver paste layer.

2. The touch screen according to claim 1, further comprising
   a first optical transparent adhesive layer arranged on a side of the first transparent substrate layer facing away from the silver paste layer;
   a second tin indium oxide layer arranged on a side of the first optical transparent adhesive layer facing away from the first transparent substrate layer; and
   a second transparent substrate layer arranged on a side of the second tin indium oxide layer facing away from the first optical transparent adhesive layer.

3. The touch screen according to claim 2, wherein the shielding layer is arranged on a surface of the first optical transparent adhesive layer facing away from the first transparent substrate layer.

4. The touch screen according to claim 2, wherein the shielding layer is arranged on a surface of the second tin indium oxide layer facing toward the second transparent substrate layer.

5. The touch screen according to claim 2, wherein the shielding layer is arranged on a surface of the first transparent substrate layer facing away from the silver paste layer.

6. The touch screen according to claim 2, further comprising:
   a second optical transparent adhesive layer arranged on a side of the first tin indium oxide layer facing away from the first transparent substrate layer; and
   a cover glass arranged on a side of the second optical transparent adhesive layer facing away from the first tin indium oxide layer.

7. The touch screen according to claim 1, wherein the shielding layer has a thickness of 5-10 μm.

8. The touch screen according to claim 7, wherein a distance between an edge of the shielding layer close to a display region of the touch screen and an edge of the display region is smaller than that between an edge of the silver paste layer close to the display region and the edge of the display region by 0.15-0.25 μm.

9. The touch screen according to claim 7, wherein the shielding layer is made of a black ink material or a black matrix material.

10. The touch screen according to claim 7, further comprising:
    a second optical transparent adhesive layer arranged on a side of the first tin indium oxide layer facing away from the first transparent substrate layer; and
    a cover glass arranged on a side of the second optical transparent adhesive layer facing away from the first tin indium oxide layer.

11. A touch-sensitive apparatus comprising the touch screen according to claim 1.

12. The touch-sensitive apparatus according to claim 11, wherein the touch screen further comprising
    a first optical transparent adhesive layer arranged on a side of the first transparent substrate layer facing away from the silver paste layer;
    a second tin indium oxide layer arranged on a side of the first optical transparent adhesive layer facing away from the first transparent substrate layer; and
    a second transparent substrate layer arranged on a side of the second tin indium oxide layer facing away from the first optical transparent adhesive layer.

13. The touch-sensitive apparatus according to claim 12, wherein the shielding layer is arranged on a surface of the first optical transparent adhesive layer facing away from the first transparent substrate layer.

14. The touch-sensitive apparatus according to claim 12, wherein the shielding layer is arranged on a surface of the second tin indium oxide layer facing toward the second transparent substrate layer.

15. The touch-sensitive apparatus according to claim 11, wherein the shielding layer has a thickness of 5-10 μm.

16. The touch-sensitive apparatus according to claim 15, wherein a distance between an edge of the shielding layer close to a display region of the touch screen and an edge of the display region is smaller than that between an edge of the silver paste layer close to the display region and the edge of the display region by 0.15-0.25 μm.

17. The touch-sensitive apparatus according to claim 15, wherein the shielding layer is made of a black ink material or a black matrix material.

18. The touch-sensitive apparatus according to claim 15, further comprising:
    a second optical transparent adhesive layer arranged on a side of the first tin indium oxide layer facing away from the first transparent substrate layer; and
    a cover glass arranged on a side of the second optical transparent adhesive layer facing away from the first tin indium oxide layer.

* * * * *